(12) United States Patent  
Yang

(10) Patent No.: US 11,797,191 B2  
(45) Date of Patent: Oct. 24, 2023

(54) SYSTEMS AND METHODS FOR STORING DATA IN SSD

(71) Applicant: ZHEJIANG HUAYIXIN TECHNOLOGY CO., LTD., Zhejiang (CN)

(72) Inventor: Chao Yang, Hangzhou (CN)

(73) Assignee: ZHEJIANG HUAYIXIN TECHNOLOGY CO., LTD., Hangzhou (CN)

( * ) Notice: Subject to any disclaimer, the term of this patent is extended or adjusted under 35 U.S.C. 154(b) by 146 days.

(21) Appl. No.: 17/072,018

(22) Filed: Oct. 15, 2020

(65) Prior Publication Data

US 2021/0117106 A1    Apr. 22, 2021

Related U.S. Application Data

(63) Continuation of application No. PCT/CN2019/083772, filed on Apr. 23, 2019.

(30) Foreign Application Priority Data

Apr. 23, 2018   (CN) .......................... 201810367486.0

(51) Int. Cl.  
*G06F 3/06* (2006.01)

(52) U.S. Cl.  
CPC ............ *G06F 3/0619* (2013.01); *G06F 3/064* (2013.01); *G06F 3/0644* (2013.01); *G06F 3/0661* (2013.01); *G06F 3/0679* (2013.01)

(58) Field of Classification Search  
CPC ...... G06F 3/0619; G06F 3/064; G06F 3/0644; G06F 3/0661; G06F 3/0679; G06F 3/061; G06F 3/0632  
See application file for complete search history.

(56) References Cited

U.S. PATENT DOCUMENTS

| 6,535,868 B1* | 3/2003 | Galeazzi ................ G06F 16/25 |
| 2006/0200639 A1* | 9/2006 | Levy .................. G06F 11/1435 |
| | | 711/162 |
| 2009/0043831 A1* | 2/2009 | Antonopoulos ...... G06F 3/0614 |
| 2010/0125702 A1* | 5/2010 | Lee ..................... G06F 11/1441 |
| | | 711/E12.001 |

(Continued)

FOREIGN PATENT DOCUMENTS

| WO | 2009023594 A2 | 2/2009 |
| WO | 2019206106 A1 | 10/2019 |

OTHER PUBLICATIONS

International Search Report in PCT/CN2019/083772 dated Jul. 25, 2019, 3 pages.

(Continued)

*Primary Examiner* — Francisco A Grullon  
(74) *Attorney, Agent, or Firm* — METIS IP LLC

(57) ABSTRACT

System and method for storage data in SSD may be provided. The method may include receiving data writing feature information sent by a file system during an initialization process. The method may include determining, based on the data writing feature information, a size of metadata storage space corresponding to the metadata. The method may further include determining, based on the size of metadata storage space, a target storage region for storing the metadata in the SSD.

20 Claims, 8 Drawing Sheets

(56) References Cited

U.S. PATENT DOCUMENTS

| | | | |
|---|---|---|---|
| 2011/0093650 A1* | 4/2011 | Kwon | G06F 12/0238 |
| | | | 711/E12.001 |
| 2014/0025874 A1 | 1/2014 | Kwon et al. | |
| 2015/0052395 A1* | 2/2015 | Wipfel | G06F 3/0683 |
| | | | 714/19 |
| 2017/0083260 A1* | 3/2017 | Caraccio | G06F 3/0679 |
| 2018/0196755 A1* | 7/2018 | Kusuno | G06F 12/0893 |
| 2019/0043540 A1* | 2/2019 | Chagam Reddy | G06F 3/0616 |
| 2020/0058353 A1* | 2/2020 | Frederiksen | G06F 12/0246 |
| 2021/0133061 A1* | 5/2021 | Ware | G11C 29/76 |

OTHER PUBLICATIONS

Written Opinion in PCT/CN2019/083772 dated Jul. 25, 2019, 5 pages.
The Extended European Search Report in European Application No. 19791894.9 dated Apr. 9, 2021, 9 pages.

* cited by examiner

| Word | Name | Description |
|---|---|---|
| 00h | (Feature) | (Reserved) |
| 01h | Count | The number of logical sectors to be transferred. A value of 00h indicates that 256 logical sectors are to be transferred. Bits 15:8 shall be cleared to zero |
| 02h | LBA | MSB — Address of first logical sector to be transferred. Bits 47:28 shall be cleared to zero — LSB |
| 03h | | |
| 04h | | |
| 05h | Command | C8h |

FIG. 9

SYSTEMS AND METHODS FOR STORING DATA IN SSD

CROSS-REFERENCE TO RELATED APPLICATIONS

This application is a continuation of International Application No. PCT/CN2019/083772, filed on Apr. 23, 2019, which claims priority of Chinese Patent Application No. 201810367486.0 filed on Apr. 23, 2018, the entire contents of each of which are hereby incorporated by reference.

TECHNICAL FIELD

The present disclosure generally relates to a storage technique, and more particularly, relates to systems and methods for storing data in SSD based on data features.

BACKGROUND

Solid State Drives (SSD) is a hard disk that composes of solid state electronic memory chip array(s). The SSD may include a control unit and a storage unit (such as a FLASH chip, a DRAM chip, etc.). It is general that there are two types of SSDs on the market. One is a consumer product used by ordinary consumers. The first kind of SSD may adopt a SATA (Serial Advanced Technology Attachment) interface, and have a general performance. It may be suitable for reading data instead of writing data. In some cases, it is mainly for household use. The other is an enterprise-class product. The second kind of SSD may adopt a PCIE+NVME protocol, and have an advantage of low latency and top performance. But it is expensive.

The two kinds of SSDs above may be common. There may be no specific mechanism for identifying a file system. The storage for metadata of the file system may be the same as the storage for normal data. Currently, TLC Nand flash (e.g., the TLC Nand flash stores 3 bits of information in one memory cell) and QLC (Quad-level Cell) Nand flash (e.g., the QLC Nand flash stores 4 bits of information in one memory cell) may be widely used, the storage density of the Nand flash becomes much higher and the number of rewritable times becomes much fewer, which may result in a poor storage reliability of Nand flash. For the common SSD, Flash of TLC (Triple-level cell) medium may be utilized as a storage medium of the SSD. If the metadata of the file system is stored in the TLC medium, the safety and reliability of data storage may be poor. For example, in some occasions, if the metadata is failed to read or write, the file system may be unable to read/write normally, even the file system would crash. It may cause a poor reliability of data storage. Therefore, it is desirable to develop systems and methods for storing data in SSD to improve the reliability of data storage.

SUMMARY

According to an aspect of the present disclosure, a storage method for SSD may be provided. The method may include one or more of the following operations. At least one processor may receive data writing feature information sent by a file system during an initialization process. The data writing feature information may indicate that a data segment corresponding to metadata in the file system and a writing feature corresponding to the data segment. The at least one processor may determine, based on the data writing feature information, a size of metadata storage space corresponding to the metadata. The at least one processor may determine, based on the size of metadata storage space, a target storage region for storing the metadata in the SSD. The size of the storage space of the target storage region may be not less than the metadata storage space, and a data storage capacity of a memory cell in the target storage region may be less than the data storage capacity of the memory cell in other storage regions excluding the target storage region in the SSD.

In some embodiments, the at least one processor may determine, based on a plurality of data segments corresponding to the metadata and the writing feature corresponding to each data segment, a size of the storage space of each data segment. The at least one processor may determine the size of metadata storage space corresponding to the metadata based on a sum of the size of the storage space of each data segment.

In some embodiments, the at least one processor may determine, based on the size of metadata storage space, a storage space that is greater than or equal to the metadata storage space as the target storage region. The at least one processor may set a storage mode of the target storage region as a single level cell (SLC) memory mode.

In some embodiments, the at least one processor may determine, based on the size of metadata storage space, a storage space for storing backup data regarding the metadata.

In some embodiments, the at least one processor may receive a read/write instruction sent by the file system. The at least one processor may determine whether the read/write instruction satisfies a preset rule. The preset rule may include whether the read/write instruction is a preset private command for reading or writing metadata or not, or whether a logical block address carried with the read/write instruction is a logical block address corresponding to the metadata or not. In response to the determination that the read/write instruction satisfies the preset rule, the at least one processor may perform read/write operations for the metadata based on the read/write instruction.

In some embodiments, the at least one processor may receive an acquisition instruction from the file system. The acquisition instruction may be used to acquire SSD information regarding the SSD, and the SSD information may include at least one of a device model and a physical page information regarding the SSD. The at least one processor may send the SSD information to the file system. The file system may determine whether the SSD is a preset SSD based on the device model, and/or set a physical page size in a write operation corresponding to the metadata based on the physical page size indicated by the physical page information.

According to another aspect of the present disclosure, a storage method for SSD based on data features is provided. The method may include one or more of the following operations. At least one processor may generate, during an initialization process, data writing feature information indicating that a data segment corresponding to metadata in the file system and a writing feature corresponding to the data segment. The at least one processor may send the data writing feature information to the SSD. The SSD may determine a target storage region for storing the metadata in the SSD based on the data writing feature information. A size of a storage space of the target storage region may be not less than a metadata storage space, and a data storage capacity of a memory cell in the target storage region may be less than the data storage capacity of the memory cell in other storage regions excluding the target storage region in the SSD.

In some embodiments, the at least one processor may read SSD information regarding the SSD, the SSD information including at least one of a device model and a physical page information regarding the SSD. The at least one processor may determine whether the SSD is a preset SSD based on the device model or set a physical page size in a write operation corresponding to the metadata based on the physical page size indicated by the physical page information.

In some embodiments, the at least one processor may receive a read/write instruction from a host device. The at least one processor may send the read/write instruction to the SSD. The SSD may perform, based on the read/write instruction, read/write operations for the metadata, wherein the read/write instruction is a preset private command for reading and writing the metadata, or a logical block address carried with the read/write instruction is a logical block address corresponding to the metadata.

According to an aspect of the present disclosure, a storage system for SSD may be provided. The system may include at least one storage device and at least one processor configured to communicate with the at least one storage device. The at least one storage device may include a set of instructions. When the at least one storage device executes the set of instructions, the at least one processor may be directed to perform one or more of the following operations. The at least one processor may receive data writing feature information sent by a file system during an initialization process. The data writing feature information may indicate that a data segment corresponding to metadata in the file system and a writing feature corresponding to the data segment. The at least one processor may determine, based on the data writing feature information, a size of metadata storage space corresponding to the metadata. The at least one processor may determine, based on the size of metadata storage space, a target storage region for storing the metadata in the SSD. The size of the storage space of the target storage region may be not less than the metadata storage space, and a data storage capacity of a memory cell in the target storage region may be less than the data storage capacity of the memory cell in other storage regions excluding the target storage region in the SSD.

According to an aspect of the present disclosure, a storage system for a file system may be provided. The system may include at least one storage device and at least one processor configured to communicate with the at least one storage device. The at least one storage device may include a set of instructions. When the at least one storage device executes the set of instructions, the at least one processor may be directed to perform one or more of the following operations. The at least one processor may generate, during an initialization process, data writing feature information indicating that a data segment corresponding to metadata in the file system and a writing feature corresponding to the data segment. The at least one processor may send the data writing feature information to the SSD. The SSD may determine a target storage region for storing the metadata in the SSD based on the data writing feature information. A size of a storage space of the target storage region may be not less than a metadata storage space, and a data storage capacity of a memory cell in the target storage region may be less than the data storage capacity of the memory cell in other storage regions excluding the target storage region in the SSD.

According to an aspect of the present disclosure, a storage system for SSD may be provided. The system may include a receiving module, a determination module, and a processing module. The receiving module may receive data writing feature information sent by a file system during an initialization process, and the data writing feature information may indicate that a data segment corresponding to metadata in the file system and a writing feature corresponding to the data segment. The determination module may determine, based on the data writing feature information, a size of metadata storage space corresponding to the metadata. The processing module may determine, based on the size of metadata storage space, a target storage region for storing the metadata in the SSD. The size of the storage space of the target storage region may be not less than the metadata storage space, and a data storage capacity of a memory cell in the target storage region may be less than the data storage capacity of the memory cell in other storage regions excluding the target storage region in the SSD.

In some embodiments, the determination module may further determine, based on a plurality of data segments corresponding to the metadata and the writing feature corresponding to each data segment, a size of the storage space of each data segment. The determination module may determine the size of metadata storage space corresponding to the metadata based on a sum of the size of the storage space of each data segment.

In some embodiments, the processing module may determine, based on the size of metadata storage space, a storage space that is greater than or equal to the metadata storage space as the target storage region. The processing module may set a storage mode of the target storage region as a single level cell (SLC) memory mode.

In some embodiments, the processing module may determine, based on the size of metadata storage space, a storage space for storing backup data regarding the metadata.

In some embodiments, the receiving module may further receive a read/write instruction sent by the file system. The processing module may determine whether the read/write instruction satisfies a preset rule. In response to the determination that the read/write instruction satisfies the preset rule, the processing module may perform read/write operations for the metadata based on the read/write instruction. The preset rule may include whether the read/write instruction is a preset private command for reading or writing metadata or not, or whether a logical block address carried with the read/write instruction is a logical block address corresponding to the metadata or not.

In some embodiments, the system may further include a sending module. The receiving module may be further receive an acquisition instruction from the file system. The acquisition instruction may be used to acquire SSD information regarding the SSD, and the SSD information includes at least one of a device model and a physical page information regarding the SSD. The sending module may further send the SSD information to the file system. The file system may determine whether the SSD is a preset SSD based on the device model, and/or set a physical page size in a write operation corresponding to the metadata based on the physical page size indicated by the physical page information.

According to an aspect of the present disclosure, a storage system for a file system may be provided. The system may include a generation module and a sending module. The generating module may generate data writing feature information during an initialization process. The data writing feature information may indicate that a data segment corresponding to metadata in the file system and a writing feature corresponding to the data segment. The sending module may send the data writing feature information to the SSD. The SSD may determine a target storage region for storing the metadata in the SSD based on the data writing feature information. A size of a storage space of the target storage region may be not less than a metadata storage space, and a data storage capacity of a memory cell in the target storage region may be less than the data storage capacity of the memory cell in other storage regions excluding the target storage region in the SSD.

In some embodiments, the system may further include a reading module and a comparison module. The reading module may read SSD information regarding the SSD before the generating module generates data writing feature information. The SSD information may include at least one of a device model and a physical page information regarding the SSD. The comparison module may determine whether the SSD is a preset SSD based on the device model or set a physical page size in a write operation corresponding to the metadata based on the physical page size indicated by the physical page information.

In some embodiments, the system may further include an acquisition module. The acquisition module may receive a read/write instruction from a host device after the sending module sends the data writing feature information to the SSD. The send module may further send the read/write instruction to the SSD. The SSD may perform, based on the read/write instruction, read/write operations for the metadata. The read/write instruction may be a preset private command for reading and writing the metadata, or a logical block address carried with the read/write instruction is a logical block address corresponding to the metadata.

According to another aspect of the present disclosure, a non-transitory computer readable medium is provided. The non-transitory computer readable medium may include at least one set of instructions that causes at least one processor to effectuate a method. The at least one processor may receive data writing feature information sent by a file system during an initialization process. The data writing feature information may indicate that a data segment corresponding to metadata in the file system and a writing feature corresponding to the data segment. The at least one processor may determine, based on the data writing feature information, a size of metadata storage space corresponding to the metadata. The at least one processor may determine, based on the size of metadata storage space, a target storage region for storing the metadata in the SSD. The size of the storage space of the target storage region may be not less than the metadata storage space, and a data storage capacity of a memory cell in the target storage region may be less than the data storage capacity of the memory cell in other storage regions excluding the target storage region in the SSD.

According to another aspect of the present disclosure, a non-transitory computer readable medium is provided. The non-transitory computer readable medium may include at least one set of instructions that causes at least one processor to effectuate a method. The at least one processor may generate, during an initialization process, data writing feature information indicating that a data segment corresponding to metadata in the file system and a writing feature corresponding to the data segment. The at least one processor may send the data writing feature information to the SSD. The SSD may determine a target storage region for storing the metadata in the SSD based on the data writing feature information. A size of a storage space of the target storage region may be not less than a metadata storage space, and a data storage capacity of a memory cell in the target storage region may be less than the data storage capacity of the memory cell in other storage regions excluding the target storage region in the SSD.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 9 is a schematic diagram illustrating exemplary private command settings according to some embodiments of the present disclosure.

DETAILED DESCRIPTION

Figure 1:
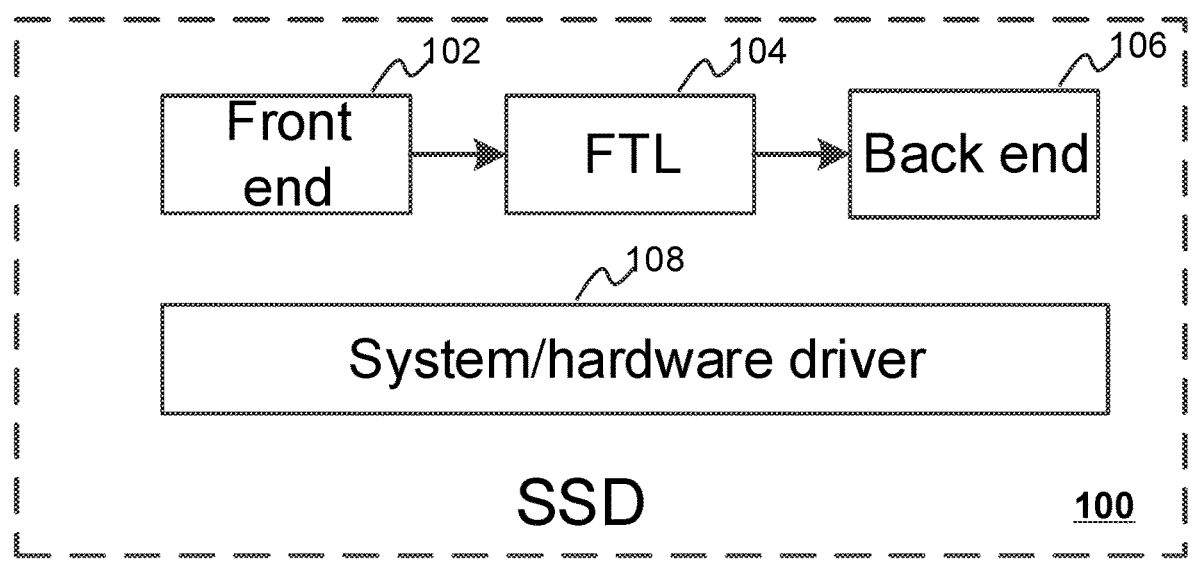
FIG. 1 is a schematic diagram illustrating an exemplary SSD scheme according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure. However, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flowcharts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure are described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

To facilitate understanding of the present disclosure, the terminology used herein is for the purposes of describing particular examples and embodiments only, and is not intended to be limiting. As used herein, Solid State Drives (hereinafter SSD) refers to a computer storage device that include a permanent memory (e.g., a flash memory) or a non-permanent memory (e.g., a synchronous dynamic random access memory (SDRAM)). As described in connection with FIG. 1, FIG. 1 illustrates an exemplary SSD scheme according to some embodiments of the present disclosure. As shown in FIG. 1, a firmware structure of SSD 100 may include a front end 102, FTL (Flash Translation Layer) 104, a back end 106, and a system/hardware driver 108. The front end 102 may be configured to directly connect to a host device (e.g., a computing device, such as, a computer, a server, a mobile terminal) via an interface. For example, the front end 102 may include a Serial ATA (SATA) interface or a PCIE (e.g., PCI-Express, which is a high-speed serial computer expansion bus standard) interface. The back end 106 may include a Nand flash chip. The Nand flash chip may include but not limited to a single level cell (SLC) flash, a multi-level cell (MLC) flash, or triple-level cell (TLC) flash. In some embodiments, the TLC flash memory may include a SLC memory mode, a MLC memory mode, a TLC memory mode. It should be noted that various memory modes may be applied to the TLC flash. The TLC flash may be used widely. The advantage of TLC flash is that TLC has a high storage density and it is inexpensive. But TLC flash may be not relatively stable, which is easy to cause bad blocks during use. The FTL 104 may be an intermediate conversion module that converts a host address (e.g., a logical block address, LBA) into a physical address of the flash, and performs one or more operations, such as wear leveling and/or garbage collection. The system/hardware driver 108 may provide an interface that enables communication between the host device's operating system or applications and common hardware devices found on the host device.

In computer field, a file system refers to a method and/or a data structure that an operating system is used to identify a storage device (e.g., a disk, or a Nand flash-based SSD) or a file on a storage area. In some embodiments, the file system may be designated as a method for managing files on a storage device. The file system may control how data is stored and retrieved. In some embodiments, the file system may also refer to a hardware/software module for managing and storing files in the operating system. The file system may include an interface of the file system, a software collection for object manipulation and management, an object and its attributes. The file system may organize and allocate a storage space of the storage device, and be responsible for storing file, protecting and/or retrieving the stored file. In some embodiments, the file system may be used to create files, store files, read files, modify files, dump files, control access to files, and/or undo files when users no longer use them.

Figure 6:
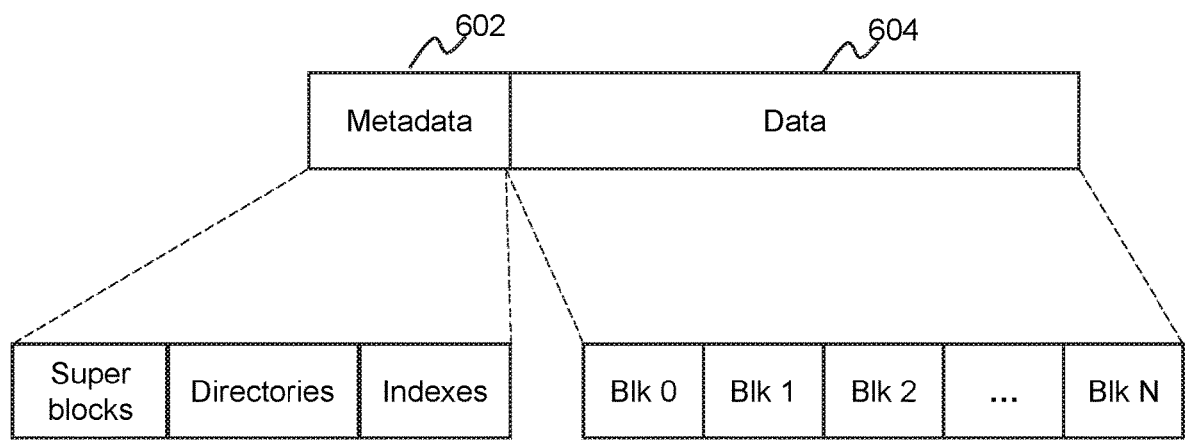
FIG. 6 is a schematic diagram illustrating an exemplary data structure in a file system according to some embodiments of the present disclosure.

In some embodiments, the file system may include a plurality of data segments, such as normal data (e.g., data 604 illustrated in FIG. 6) and/or metadata (e.g., metadata 602 illustrated in FIG. 6). Metadata refers to data that is used to describe data (that is, metadata is data about data). The metadata may be also called mediation data, or relay data. The metadata may describe data property regarding the data. The metadata may be used to support one or more operations, for example, querying a storage location, historical data, a resource, and/or a file record. The metadata may be designated as an electronic catalogue. To achieve the purpose of cataloging, it is necessary to describe and collect data contents or data features, so as to assist to the data retrieval.

Figure 2:
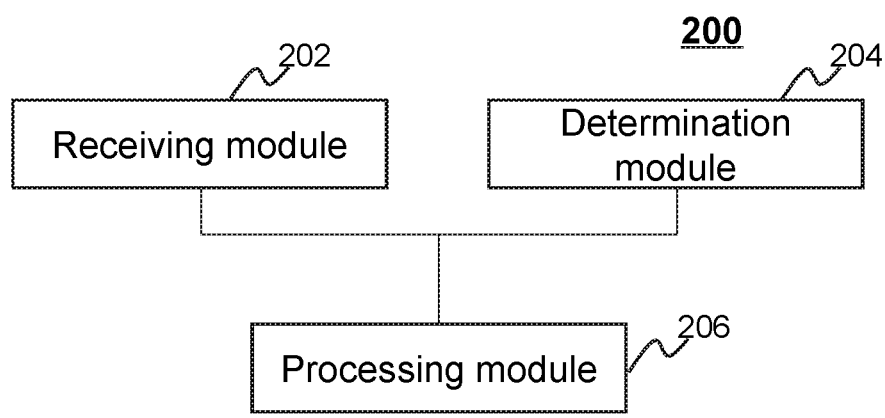
FIG. 2 is a block diagram illustrating an exemplary storage system for SSD according to some embodiments of the present disclosure.

FIG. 2 is a block diagram illustrating an exemplary storage system for SSD (hereinafter SSD storage system) according to some embodiments of the present disclosure. In some embodiments, SSD storage system 200 may be implemented on a computing device, more particularly, the SSD configured in the computing device. As used herein, the term "SSD storage system" and "SSD" may be used interchangeably to refer to an entity, or a tool that stores data. As shown in FIG. 2, the SSD storage system 200 may include a receiving module 202, a determination module 204 and a processing module 206.

As used herein, the computing device may include a personal computer (PC), a server, a mobile device, or other types of workstations or terminal devices. Generally, the words "engine," "module," and "unit" as used herein, refer to logic embodied in hardware or firmware, or to a collection of software instructions. The engines, modules, and units described herein may be implemented as software and/or hardware modules and may be stored in any type of non-transitory computer-readable medium or another storage device. In some embodiments, a software module can be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

In some embodiments, the receiving module 202 may receive data writing feature information sent by a file system during an initialization process. The data writing feature information may indicate that a data segment corresponding to metadata in the file system and a writing feature corresponding to the data segment. For example, the data writing feature information may include segmentation information regarding the data segment corresponding to the metadata and the writing feature regarding each data segment. The segmentation information may include a starting address, an end address, a write cycle, a write length, a data type, or the like, or any combination. The writing feature may include but not limited to a write cycle, a size of a data block (hereinafter a block size). In some embodiments, the receiving module 202 may receive a read/write instruction sent by the file system. In some embodiments, the receiving module 202 may receive an acquisition instruction from the file system. The acquisition instruction may be used to acquire SSD information regarding the SSD. The SSD information may include an SSD device model, physical page information, production information, or the like, or any combination thereof.

In some embodiments, the determination module 204 may determine, based on the data writing feature information, a size of metadata storage space corresponding to the metadata. Specifically, the determination module 204 may determine, based on a plurality of data segments corresponding to the metadata and the writing feature corresponding to each data segment, a size of the storage space of each data segment. For example, the determination module 204 may determine the size of the storage space of each data segment based on Equation (1) as illustrated in operation 504 of FIG. 5. The determination module 204 may determine the size of metadata storage space corresponding to the metadata based on a sum of the size of the storage space of each data segment. For example, the determination module 204 may determine the size of metadata storage space based on Equation (2) as illustrated in operation 504 of FIG. 5.

In some embodiments, the processing module 206 may determine, based on the size of metadata storage space, a target storage region for storing the metadata in the SSD. In some embodiments, the size of the storage space of the target storage region may be not less than the metadata storage space. A data storage capacity of a memory cell in the target storage region may be less than the data storage capacity of the memory cell in other storage regions excluding the target storage region in the SSD. In some embodiments, the processing module 206 may determine, based on the size of metadata storage space, a storage space that is greater than or equal to the metadata storage space as the target storage region. The processing module 206 may a storage mode of the target storage region as a SLC memory mode. In some embodiments, the processing module 206 may set, based on the size of metadata storage space, a storage region for storing the backup regarding the metadata (also referred to herein as backup storage region). In some embodiments, the processing module 206 may determine whether the read/write instruction satisfies a preset rule. The preset rule may include whether the read/write instruction is a preset private command for reading or writing metadata or not, or whether a logical block address carried with the read/write instruction is a logical block address corresponding to the metadata or not. If the read/write instruction satisfies the preset rule, the processing module 206 may perform read/write operations for the metadata based on the read/write instruction.

It should be noted that the above descriptions of the SSD storage system 200 are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. For example, the SSD storage system 300 may further include a sending module. The sending module may send SSD information to the file system. The file system may determine whether the SSD is a preset SSD based on the SSD device model included in the SSD information. The file system may further set a physical page size in a write operation corresponding to the metadata based on the physical page size indicated by the physical page information.

Figure 3:
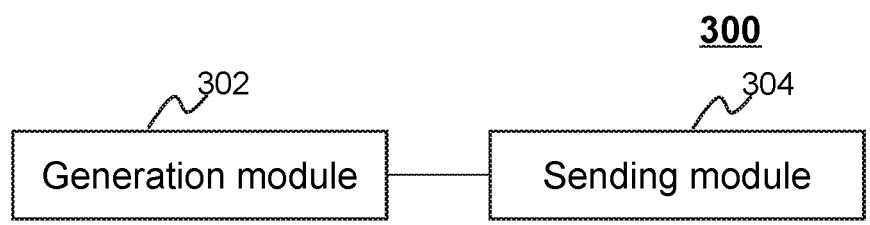
FIG. 3 is a block diagram illustrating an exemplary storage system for a file system according to some embodiments of the present disclosure.

FIG. 3 is a block diagram illustrating an exemplary storage system for a file system according to some embodiments of the present disclosure. In some embodiments, the storage system 300 for the file system may be implemented on a computing device. In some embodiments, the storage systems 300 may be integrated to the file system in the computing device. As used herein, the term "the storage system for the file system" and "file system" may be used interchangeably to refer to an entity, or a tool that stores data. As shown in FIG. 3, the storage system 300 may include a generation module 302 and a sending module 304.

The modules may be hardware circuits of at least part of the computing device. The modules may also be implemented as an application or set of instructions read and executed by the computing device. Further, the modules may be any combination of the hardware circuits and the application/instructions. For example, the modules may be the part of the computing device when the computing device is executing the application/set of instructions.

In some embodiments, during an initialization process, the generation module 302 may generate data writing feature information. The data writing information may include a data segment corresponding to metadata in the file system and a writing feature corresponding to the data segment.

In some embodiments, the sending module 304 may send the data writing feature information to the SSD. The SSD storage system 200 in the SSD may determine a target storage region for storing the metadata in the SSD based on the data writing feature information. Specifically, the SSD storage system 200 in the SSD may determine a size of metadata storage space corresponding to the metadata based on the data writing feature information. The SSD storage system 200 in the SSD may determine the target storage region based on the size of metadata storage space. In some embodiments, the size of the storage space of the target storage region may be not less than the metadata storage space. A data storage capacity of a memory cell in the target storage region may be less than the data storage capacity of the memory cell in other storage regions excluding the target storage region in the SSD.

In some embodiments, the storage system 300 may include a reading module (not shown in FIG. 3). The reading module may read SSD information from the SSD. The SSD information may include an SSD device model, physical page information, production information, or the like, or any combination thereof.

In some embodiments, the storage system 300 may include a comparison module (not shown in FIG. 3). Upon receipt of the SSD information, the comparison module may compare the obtained SSD device model with a preset SSD device model, so as to determine whether the current SSD matches a preset SSD corresponding to the type of the file system. The comparison module may also set a physical page size in a write operation corresponding to the metadata based on the physical page size indicated by the physical page information.

In some embodiments, the storage system 300 may include an acquisition module (not shown in FIG. 3). The acquisition module may receive a read/write instruction from a host device. The read/write instruction may be used to read/write data from the host device. Then the sending module 304 may send the read/write instruction to the SSD. The read/write instruction may include a preset private command for reading or writing metadata, or a logical block address corresponding to the metadata. In some embodiments, upon receipt of the read/write instruction for the metadata, the SSD storage system 200 may read the metadata in the target storage region according to the private command, or read the metadata in the target storage region according to the logical block address carried with the read/write instruction.

It should be noted that the above descriptions of the storage system 300 for file system are merely provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. For example, the reading module may be integrated to the acquisition module. As another example, the generation module and the comparison module may be integrated to a single module.

Figure 4:
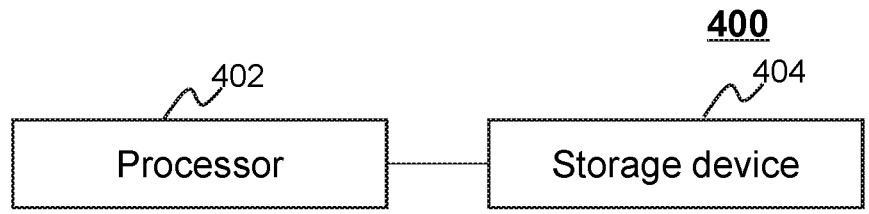
FIG. 4 is a block diagram illustrating an exemplary computing device according to some embodiments of the present disclosure.

FIG. 4 is a block diagram illustrating an exemplary computing device according to some embodiments of the present disclosure. In some embodiments, the SSD storage system 200 for the SSD, and/or the storage system 300 for the file system may be implemented on computing device 400. The computing device 400 may be configured to implement any components that perform one or more functions disclosed in the present disclosure. As shown in FIG. 0.4, the computing device 400 may at least include a processor 402 and a storage device 404. The processor 402 may execute or use to perform exemplary methods described in the present disclosure (e.g., FIG. 5 or FIG. 10, and the descriptions thereof). The storage device 404 may include store data and/or instructions that the processor 402 may execute or use to perform exemplary methods described in the present disclosure.

In some embodiments, the processor 402 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the storage device 404 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 404 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Figure 5:
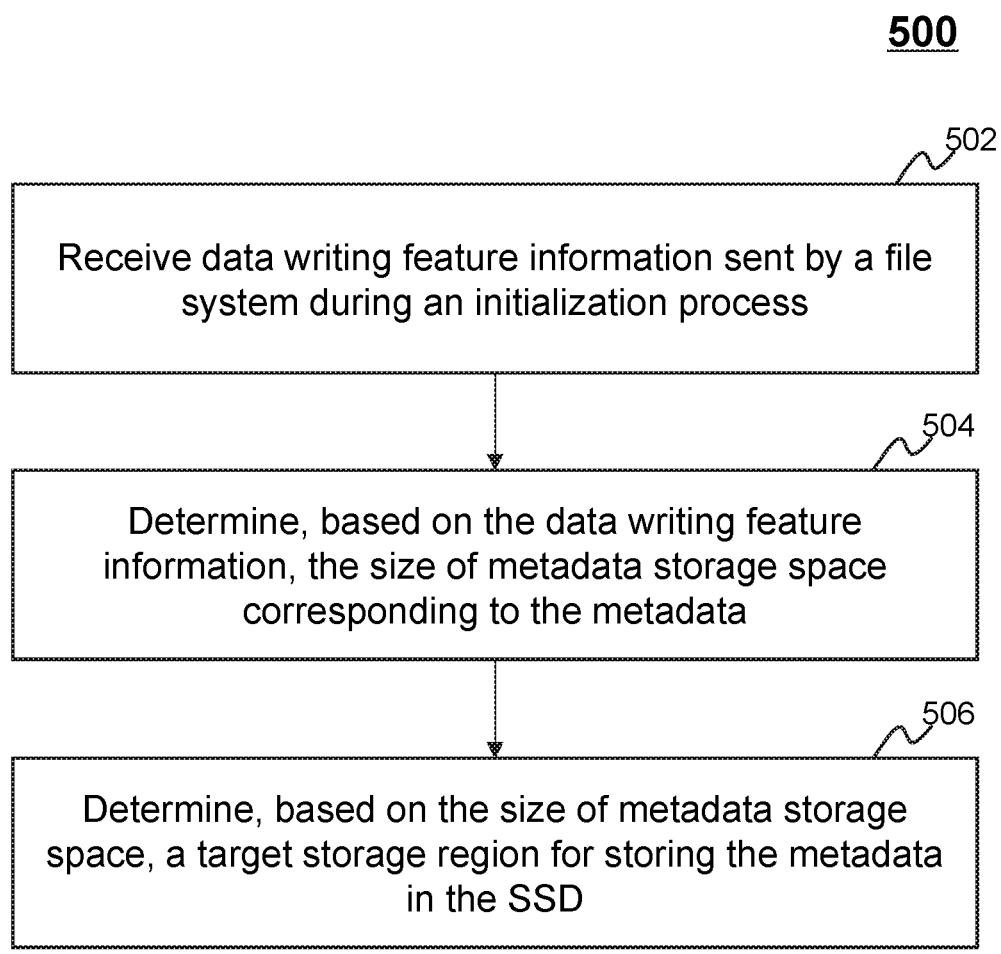
FIG. 5 is a flowchart illustrating an exemplary storage process for SSD according to some embodiments of the present disclosure.

FIG. 5 is a flowchart illustrating an exemplary storage process for SSD according to some embodiments of the present disclosure. In some embodiments, process 500 may be implemented by the SSD storage system 200 as illustrated in FIG. 2. The process 500 may also be implemented as one or more instructions stored in a storage medium and called and/or executed by at least one processor or processing circuit(s). The operations of the illustrated process presented below are intended to be illustrative. In some embodiments, the process 500 may be accomplished with one or more additional operations not described, and/or without one or more of the operations discussed.

In 502, the processor (e.g., the receiving module 202 of the SSD storage system 200) may receive data writing feature information sent by a file system during an initialization process. The data writing feature information may indicate that a data segment corresponding to metadata in the file system and a writing feature corresponding to the data segment.

In some embodiments, the data writing feature information may include segmentation information regarding the data segment corresponding to the metadata and the writing feature regarding each data segment. The segmentation information may include a starting address, an end address, a write cycle, a write length, a data type, or the like, or any combination. The writing feature may include but not limited to a write cycle, a block size. During the initialization process, the file system may send the segmentation information and the writing feature, that is, the data writing feature information, to the SSD. In some embodiments, SSD storage system 200 may identify the data structure in the file system based on the received data writing feature information, and further perform the processing of write operations for different data segments.

As described in connection with FIG. 6, FIG. 6 illustrates an exemplary data structure in a file system according to some embodiments of the present disclosure. The file system may obtain user data to be stored. The data structure may include metadata 602 and data 604. The metadata 602 may describe the data 604. The data 604 may be actual data to be stored. As used herein, the data 604 may be also referred to normal data. In some embodiments, the metadata 602 may be divided to multiple data segments, such as, super blocks, directories, indexes, and so on. The data 604 may be divided to multiple data segments, that are data blocks, such as Blk 0, Blk 1, Blk 2, . . . , Blk N. In some embodiments, the file system may obtain structure information regarding the user data. For example, the structure information may include a partition capacity, a file system type, a starting address, a data block size, the number of data segments, information regarding each data segment, or the like, or any combination thereof.

In some embodiment, prior to operation 502, when the host device is powered on, SSD storage system 200 may perform a general initialization. When the initialization is completed, the SSD storage system 200 may respond to the host device's commands. For example, after the SSD completes the initialization, the receiving module 202 of the SSD storage system 200 may receive an acquisition instruction sent by the file system during the initialization process, for example, the acquisition instruction may include a request for reading SSD information from the file system. The receiving module 202 may send the SSD information to the file system in response to the request. The SSD information may include an SSD device model, physical page information, production information, or the like, or any combination thereof. In some embodiments, the file system may determine whether the SSD is a preset SSD by comparing the device model. The preset SSD may include the SSD that is configured in advance according to the file system type. In other words, the preset SSD corresponds to the file system type. In some embodiments, the file system type may include but not limited to ext2, ext3, ext4, xfs, brtfs, zfs, FAT16, FAT32, NTFS, RAMFS, ISO 9660, NFS, SMBAFS/ CIFS, Linux swap, or the like, or any combination thereof. In some embodiments, the file system may also include various private file systems corresponding to different operation systems and/or software systems (e.g., a security and protection system). In some embodiments, the file system may set a physical page size in a write operation corresponding to the metadata based on the physical page size indicated by the physical page information. For example, if the physical page size of the SSD is 16 k (kilobyte), the page size of the file system may be set as 16 k, which is equal to the physical page size of the SSD. In some embodiments, during the initialization process, the file system may set various parameters based on the SSD information, for example, setting the page size for performing page alignment between the file system and the SSD, or reducing a write amplification factor. In some embodiments, the file system may set data features based on the SSD information, for example, setting a size of the data segment of metadata, a write cycle, a block size, and so on. The data features may be used to determine a size of metadata storage space.

In 504, the processor (e.g., the determination module 204 of the SSD storage system 200) may determine, based on the data writing feature information, the size of metadata storage space corresponding to the metadata.

For example, the receiving module 202 of the SSD storage system 200 may receive the data writing feature information from the file system. The determination module 204 of the SSD storage system 200 may parse the data writing feature information to obtain corresponding data writing feature. The determination module 204 may determine the size of metadata storage space that is enough to store the metadata in the file system. Then one or more optimization operations in the FTL (e.g., the FTL 104) may be performed.

In some embodiments, a metadata storage region for storing the metadata may include a plurality of data segments regarding the metadata, therefore, a total size of the metadata storage region may be equal to a sum of the size of storage space of each data segment. In some cases, because the writing modes for at least part of the plurality of data segments may be different, the determination module 204 may determine the size of the storage space of each of the plurality of data segments based on the plurality of data segments corresponding to the metadata and the writing feature corresponding to each data segment. The determination module 204 may further determine the size of the metadata storage space by summing the size of storage space of each data segment.

Specifically, the determination module 204 may determine the size of storage space of the data segment based on Equation (1) as follows:

$$S_{sec} = \frac{Cap}{Blk \times Period} \times \left[\frac{Size + Page - 1}{Page}\right] \times Page, \quad (1)$$

where $S_{sec}$ denotes a size of a storage space of a data segment, Cap denotes a partition capacity, Blk denotes a size of a data block, Period denotes a write cycle, Size denotes a block size. Page denotes a physical page size. The brackets [ ] refers to an integer operator. Noted that if an index is updated by writing n data blocks, the value of the Period is equal to n. In other words, the value of the Period may be equal to the number of data blocks.

In some embodiments, if the size of storage space of each data segment is determined, the determination module 204 may determine the size of the metadata storage space based on Equation (2) as follows:

$$S_{total} = \Sigma S_{sec} \quad (2),$$

where $S_{total}$ denotes the size of the metadata storage space.

In 506, the processor (e.g., the processing module 206 of the SSD storage system 200) may determine, based on the size of metadata storage space, a target storage region for storing the metadata in the SSD. In some embodiments, the size of the storage space of the target storage region may be not less than the metadata storage space. A data storage capacity of a memory cell in the target storage region may be less than the data storage capacity of the memory cell in other storage regions excluding the target storage region in the SSD. A reliable storage region (e.g., a SLC region) may be used to store the metadata so as to improve the storage reliability of data.

Specifically, the processing module 206 of the SSD storage system 200 may determine a storage space that is greater than or equal to the metadata storage space as the target storage region. The processing module 206 may further set a storage mode of the target storage region as a single level cell (SLC) memory mode. As used herein, the storage region having the SLC memory mode may be designated as the SLC region.

In SLC memory mode, one memory cell may store 1 bit of information. In TLC memory mode, one memory cell may store 3 bits of information. Compared with TLC memory mode, the number of rewritable times for the SLC memory mode is more than 20 times than the TLC memory mode. The read/write speed is faster in the SLC memory mode. Therefore, the SLC memory mode is set as the storage mode of the target storage region, which may reduce a storage density of the storage medium in the SSD, and improve the reliability and performance of data storage in the SSD. In some cases, since the amount of metadata of the file system is relatively small, accordingly the capacity loss caused by the low storage density is very small, even it may be neglected.

In some embodiments, the processing module 206 of the SSD storage system 200 may partition a storage region of the SLC memory mode in the storage region of SSD (e.g., the storage region of the TLC memory mode, hereinafter TLC region). The storage region in the SLC memory mode (hereinafter SLC region) may be used to store the metadata of the file system. The data storage capacity of one memory cell in the SLC region may be less than the data storage capacity of one memory cell in the TLC region. A relatively more reliable SLC region may be used to store the metadata, which may improve the reliability of the storage of metadata of the file system, and ensure that the file system works normally. The use of the SLC region may solve and optimize the problems that the TLC storage medium is unstable and the bad block caused by the TLC storage medium is easy to cause the loss of the metadata.

In some embodiments, the processing module 206 of the SSD storage system 200 may perform optimization operations in the FTL layer based on the data writing feature information. The optimization operations may include, for example, storing the metadata in the SLC region, and backing up the metadata. The backup of the metadata may improve the reliability of metadata storage. For example, when the amount of the metadata is relatively small, the processing module 206 may back up the metadata. In some embodiments, one or more copies of backup regarding the metadata may be stored in the SSD. As another example, when the amount of the metadata is relatively big, to save the storage capacity, the processing module 206 may also perform RAID (Redundant Array of Independent Disks) scheme. The RAID scheme may include RAID 0, RAID 1, RAID 2, RAID 5, RAID 6, and so on. In some embodiments, RAID 5 may be used to store the metadata. In RAID 5 scheme, disk striping and distributed parity may be combined use. For example, the processing module 206 may perform the disk striping, that is, storing consecutive segments of metadata across different storage devices. When the metadata is written to the storage device(s) in RAID 5 scheme, the processing module 206 may determine parity and write the parity into the corresponding storage device. In RAID 5 scheme, by keeping metadata on each storage device, any two storage device may combine to equal the metadata stored on the third storage device, which may keep data secure in case of a single storage device failure. In some embodiments, the processing module 206 may also perform other optimization operations, for example, predicting metadata read or metadata cache. The one or more optimization operations may improve the performance of data storage in SSD.

In some embodiments, when the SSD storage system 200 backs up the metadata, a storage region for storing the backup regarding the metadata (hereinafter backup storage region) may be set based on the size of the metadata storage space. For example, the backup storage region may be set in the TLC region of the SSD. The backup storage region stores the backup data regarding the metadata. In some cases, if the SSD storage system 200 is unable to read the metadata normally, the SSD storage system 200 may access the backup storage region to read the backup data. The use of backup operation may store multiple copies of data, but it may occupy little storage space, which may improve the reliability of the data storage.

In some embodiments, after operation 506, the receiving module 202 of the SSD storage system 200 may receive a read/write instruction from the file system. Specifically, the file system may receive the read/write instruction from a host device via an interface. The read/write instruction may include one or more read and/or write operations for normal data or metadata. In some embodiments, the processing module 206 of the SSD storage system 200 may determine whether the read/write instruction satisfies a preset rule. In response to the determination that the read/write instruction satisfies the preset rule, the processing module 206 may perform the read/write operations for the metadata based on the read/write instruction. In some embodiments, the preset rule may include whether the read/write instruction is a preset private command for reading or writing metadata or not, or whether a logical block address carried with the read/write instruction is a logical block address corresponding to the metadata or not.

For example, if the read/write instruction is the preset private command for reading or writing metadata, the processing module 206 may perform corresponding read/write operations for the metadata in accordance with the read/write instruction. As another example, if the logical block address carried with the read/write instruction is the logical block address corresponding to the metadata, the processing module 206 may perform corresponding read/write operations for the metadata in accordance with the read/write instruction.

It should be noted that when the processing module 206 partitions the SLC region (i.e., the target storage region) in the TLC region of the SSD, and the SLC region is dedicated to store the metadata of the file system. In the case, the processing module 206 may need to perform a specific processing for read/write operations so as to read normally the metadata. The specific processing for read/write operations may include an initialization process and a data read/write process. In some embodiments, the specific processing may be performed in the front end and/or the FTL module.

Figure 8:
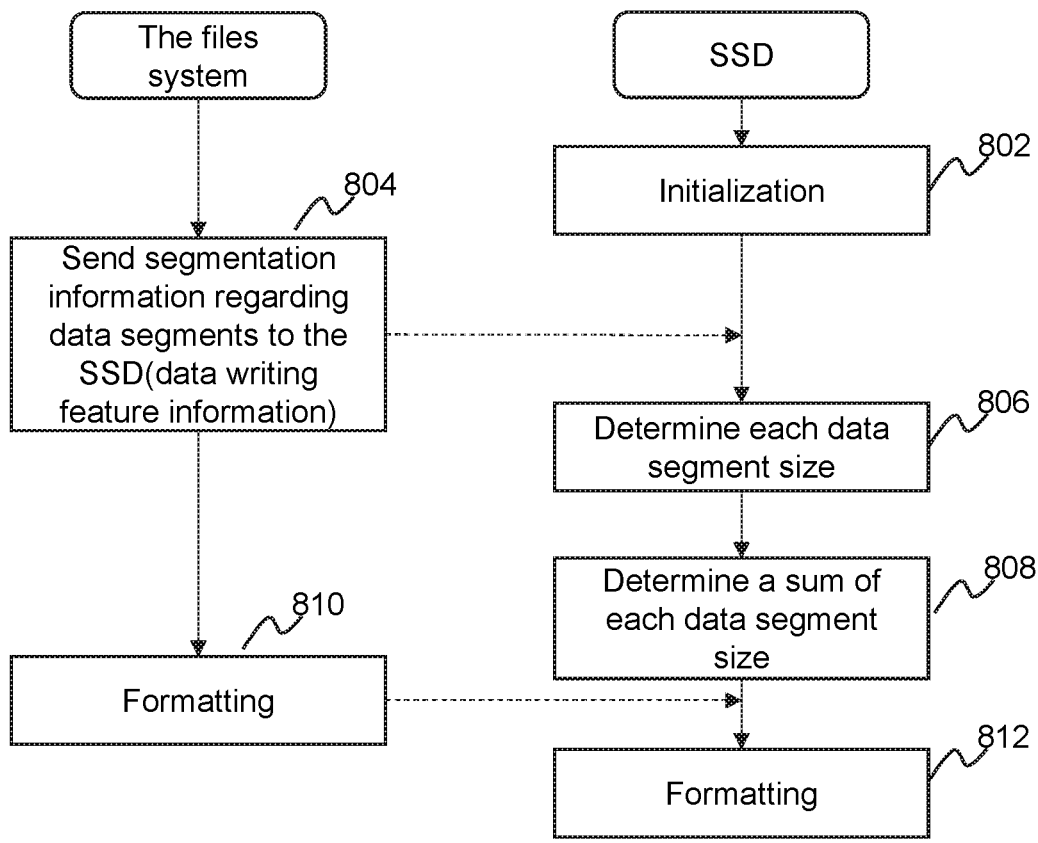
FIG. 8 is a flowchart illustrating an exemplary initialization process according to some embodiments of the present disclosure.

In some embodiments, before formatting the file system and/or the SSD, the initialization process may be performed. As described in connection with FIG. 8, FIG. 8 illustrates an exemplary initialization process according to some embodiments of the present disclosure. The initialization for the SSD may begin to be performed (operation 802). During the initialization, the file system sends segmentation information regarding data segments to the SSD (operation 804). The segmentation information may be included in the data writing feature information. The segmentation information may include the data used in the Equation (1), for example, Cap, Blk, Period. The segmentation information may also include a logical block address (LBA) corresponding to the data segment. The SSD may determine, based on the LBA, whether an instruction includes a read/write operation for the metadata. The SSD may parse the segmentation information, and determine the size of the storage space of each data segment based on the segmentation information (that is, determine each data segment size as illustrated in operation 806). The SSD may further determine the size of the metadata storage space by summing the size of the storage space of each data segment (that is, determine a sum of each data segment size as illustrated in operation 808). In some embodiments, when completing the operation 808, general formatting process for the file system and/or the SSD may be performed (operation 810 and/or operation 812).

As used herein, the data read/write process may include one or more read or write operations for the metadata instead of normal data. Therefore, it may need to determine whether the read/write instruction indicates read/write operations for the metadata or for the normal data. The SSD storage system 200 needs to make a judgment of the metadata. Specifically, the processing module 206 of the SSD storage system 200 needs to determine whether the read/write instruction satisfies the preset rule. For example, the processing module 206 may determine the read/write instruction for the metadata based on the private command and/or the logical block address.

In some embodiments, after receiving the read/write instruction, the processing module 206 may determine whether the read/write instruction is a private command. The private command may be a preset command different from the general protocol, which is dedicated to reading or writing the metadata. In some embodiments, one or more processing operations corresponding to the preset private command may be set in the SSD. For example, if the processing module 206 determines that a read instruction is the private command, the processing module 206 may directly query the processing operation corresponding to the private command, and perform the processing operation. The processing module 206 may not need to perform additional processing operations, for example, address comparison, which has little impact on performance of the SSD.

It should be noted that if the private command is set in the SSD, a corresponding interface of the private command may need to be provided for the host device. For example, the interface may be the SATA interface.

As described in connection with FIG. 9, FIG. 9 illustrates exemplary private command settings according to some embodiments of the present disclosure. As shown in FIG. 9, a structure of a Write DMA command is provided. Where the "Feature" field is reserved, and its default filed value is 0. The processing module 206 may set the private command based on the "Feature" filed. For example, when the field value of the "Feature" field is preset as 0x01, the corresponding private command may be set, and the private command is defined to write the metadata. When the processing module 206 identifies the private command, the processing module 206 may perform corresponding write operation. Similarly, the private command for reading the metadata may be preset by setting the "Feature" filed.

In some embodiments, after receiving the read/write instruction, the processing module 206 may determine whether the logical block address carried with the read/write instruction is a logical block address corresponding to the metadata. During the initialization, the file system sends data writing feature information to the SSD. The data writing feature information may include a starting address and an end address corresponding to each data segment. When the SSD receives the read/write instruction, the processing module 206 may determine whether the logical block address carried with the read/write instruction belongs to a data segment of the metadata. If the logical block address belongs to the data segment of the metadata, the processing module 206 may perform read/write operations for the metadata based on the read/write instruction. The method is that the processing module 206 determines the read/write instruction for the metadata based on the logical block address, which is good versatility and high accuracy, and does not require the host device to provide some special commands.

In some embodiments, if the read/write instruction is not for reading or writing the metadata, the processing module 206 may perform corresponding read or write operation for the normal data. For example, the processing module 206 may read or write the normal data in the storage region corresponding to the logical block address carried with the read/write instruction.

During the initialization, the SSD may interact with the file system, and obtain data writing feature information from the file system. The SLC region for storing metadata may be determined based on the data writing feature information. The SSD may perform optimization operations, such as the metadata backup, which improves the safety and reliability of data storage. The read or write for the metadata is optimized accordingly, thereby effectively improving the performance of the SSD storage system.

Figure 7:
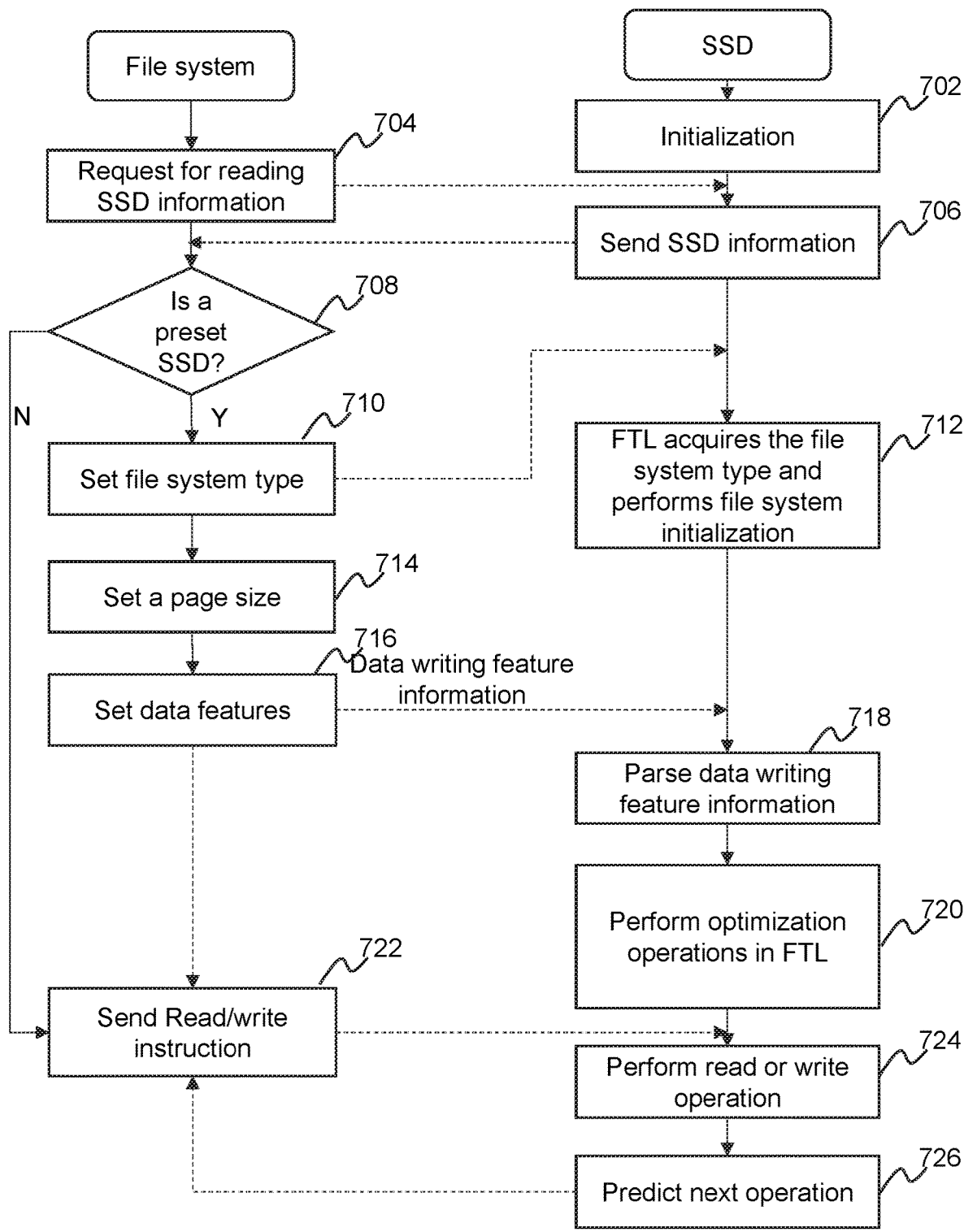
FIG. 7 is a flowchart illustrating exemplary interactions between an SSD and a file system according to some embodiments of the present disclosure.

FIG. 7 is a flowchart illustrating exemplary interactions between an SSD and a file system according to some embodiments of the present disclosure. In some embodiments, the interactions may be implemented on SSD storage system 200 in the SSD and storage system 300 in the file system.

In some embodiment, when a host device is powered on, an initialization process may be performed in the SSD (operation 702). During the initialization, the file system may send a request for reading SSD information to the SSD (operation 704). In response to the request, the SSD may send SSD information to the file system. The SSD information may include an SSD device model, physical page information, production information, or the like, or any combination thereof. The file system may determine whether the SSD is a preset SSD by comparing the device model (operation 708). In some embodiments, if the SSD is the preset SSD, the file system type may be set (operation 710). The file system type may be sent to the SSD. The FTL in the SSD may acquire the file system type, and perform file system initialization based on the file system file (operation 712). In some embodiments, after operation 710, a page size and data features may also be set (operation 714 and operation 716). The data features may include the number of data segments, a size of the data segment, a write cycle, a block size, or the like, or any combination thereof. In some embodiments, data writing feature information may be determined. The data writing feature information may include the settings included in the operations 710-716. For example, the data writing feature information may include but not limited to the file system type, the page size, the number of data segments, the size of the data segment, the write cycle, or the block size. In some embodiments, the data writing feature information may be sent to the SSD. The SSD may parse the data writing information to obtain corresponding data writing feature (operation 718). In some embodiments, the SSD may determine the size of metadata storage space that is enough to store the metadata in the file system. Then one or more optimization operations in the FTL (e.g., the FTL 104) may be performed. For example, the optimization operations may include, for example, storing the metadata in a SLC region, backing up the metadata, predicting metadata read, metadata cache, and so on. In some embodiments, the optimization operation may be customized based on the data writing feature information, for example, the optimization operation may be one-to-one correspond to the file system type. Referring back to operation 708, if the SSD is not the preset SSD, the file system may send a read/write instruction to the SSD (operation 722). The SSD may perform corresponding read or write operation in response to the read/write instruction (operation 724). For example, the SSD may perform read or write operation for metadata or normal data. Then the SSD may predict next operation (operation 726), for example, the next operation is still processing read/write instruction.

Figure 10:
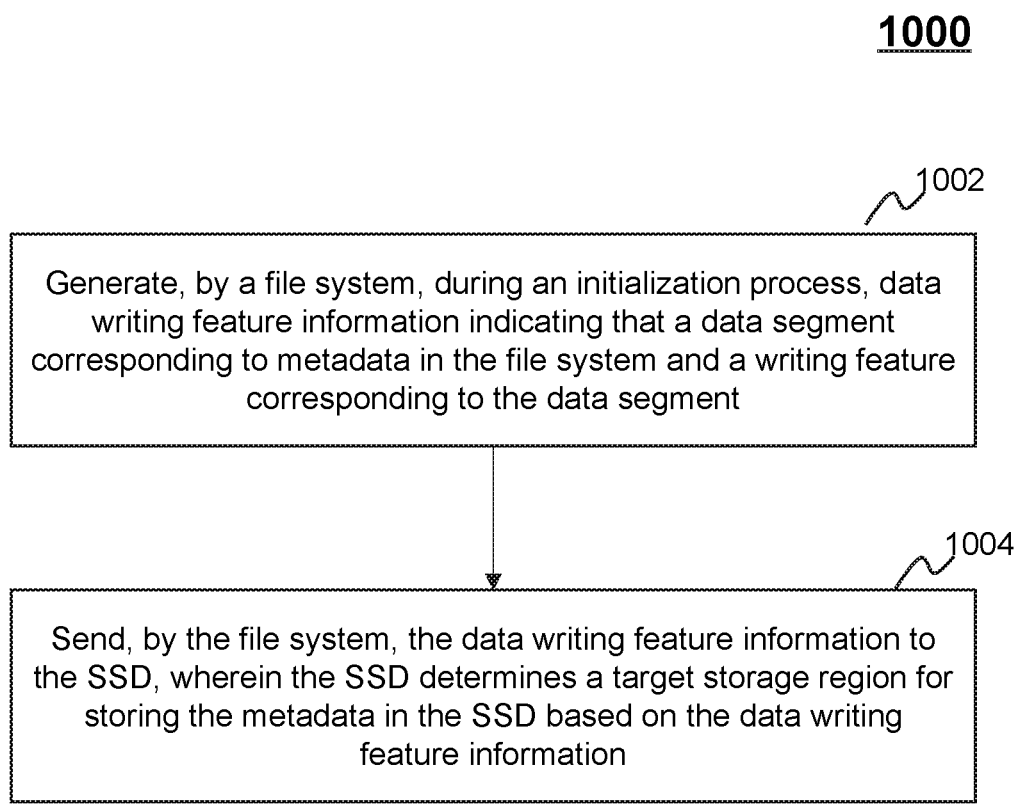
FIG. 10 is flowchart illustrating an exemplary storage process for SSD according to some embodiments of the present disclosure.

FIG. 10 is a flowchart illustrating an exemplary storage method for SSD based on data features according to some embodiments of the present disclosure. In some embodiments, process 1000 may be implemented by the storage system 300 for the file system as illustrated in FIG. 3. The process 1000 may also be implemented as one or more instructions stored in a storage medium and called and/or executed by at least one processor or processing circuit. The process 1000 may be applied to the file system. The operations of the illustrated process presented below are intended to be illustrative. In some embodiments, the process 1000 may be accomplished with one or more additional operations not described, and/or without one or more of the operations discussed.

In 1002, during an initialization process, the processor (e.g., the generation module 302 of the storage system 300 for the file system) may generate data writing feature information. The data writing information may include a data segment corresponding to metadata in the file system and a writing feature corresponding to the data segment.

In some embodiments, after a host device is powered-on, an initialization process may be performed. During the initialization process, the file system may interact with the SSD (e.g., FIG. 7, and the descriptions thereof). The generation module 302 may generate the data writing feature information based on the data segment corresponding to the metadata and the writing feature corresponding to the data segment.

In some embodiment, prior to operation 1002, a reading module of the storage system 300 may read SSD information. The SSD information may include an SSD device model, physical page information, production information, or the like, or any combination thereof. Upon receipt of the SSD information, a comparison module of the storage system 300 may compare the obtained SSD device model with a preset SSD device model, so as to determine whether the current SSD matches a preset SSD corresponding to the type of the file system. In some embodiments, the comparison module of the storage system 300 may also set a physical page size in a write operation corresponding to the metadata based on the physical page size indicated by the physical page information. The physical page is a write unit in the Flash. For example, if the physical page size of the SSD is 16 k (kilobyte), the storage system 300 may set its own page size (e.g., a minimum processing unit) based on the physical page size of the SSD, and perform page alignment. For example, the page size of the file system may be set as 16 k, which is equal to the physical page size of the SSD.

In 1004, the processor (e.g., the sending module 304 of the storage system 300 for the file system) may send the data writing feature information to the SSD. The SSD storage system 200 may determine a target storage region for storing the metadata in the SSD based on the data writing feature information. Specifically, the SSD storage system 200 may determine a size of metadata storage space corresponding to the metadata based on the data writing feature information. The SSD storage system 200 may determine the target storage region based on the size of metadata storage space. In some embodiments, the size of the storage space of the target storage region may be not less than the metadata storage space. A data storage capacity of a memory cell in the target storage region may be less than the data storage capacity of the memory cell in other storage regions excluding the target storage region in the SSD.

In some embodiments, the data writing feature information may include segmentation information regarding the data segment corresponding to the metadata and the writing feature regarding each data segment (e.g., a write cycle, a block size, etc.).

In some embodiments, when receiving the data writing feature information sent by the file system, then the SSD storage system 200 may obtain data structure of the file system by parsing the data writing characteristic information. The SSD storage system 200 may process corresponding operations for different data segments based on the data writing feature information. For example, the SSD storage system 200 may determine the size of the storage space of each of the plurality of data segments based on the plurality of data segments corresponding to the metadata and the writing feature corresponding to each data segment. The SSD storage system 200 may further determine the size of the metadata storage space by summing the size of storage space of each data segment.

In some embodiments, after the file system sends the data writing feature information to the SSD, one or more optimization operations may be performed in the SSD, so as to improve the safety and reliability of the data storage. The optimization operations may include but not limited to, storing metadata in an SLC region, backing up metadata, predicting metadata read and metadata cache.

During the initialization, the file system may interact with SSD, the SSD storage system 200 may identify the file system. Then the SSD storage system 200 may perform one or more optimization operations corresponding to the identified file system. For example, the SSD storage system 200 may partition a SLC region dedicated to storing the metadata. The reliability of the SLC memory mode is higher than the TLC memory mode. In the SLC memory mode, the backup technology may be used to improve the reliability of metadata storage.

In some embodiments, prior to operation 1002, the reading module of the storage system 300 may read SSD information. The SSD information may include an SSD device model, physical page information, a production information, or the like, or any combination thereof. Upon receipt of the SSD information, the comparison module of the storage system 300 may compare the obtained SSD device model with a preset device model, so as to determine whether the current SSD matches a preset SSD corresponding to the type of the file system. In some embodiments, the comparison module of the storage system 300 may also set a physical page size in a write operation corresponding to the metadata based on the physical page size indicated by the physical page information.

In some embodiments, after operation 1004, the acquisition module of the storage system 300 for the file system may receive a read/write instruction from the host device. The sending module 304 may send the read/write instruction to the SSD. The read/write instruction may include a preset private command for reading or writing metadata, or a logical block address corresponding to the metadata. In some embodiments, upon receipt of the read/write instruction for the metadata, the SSD storage system 200 may read the metadata in the target storage region according to the private command, or read the metadata in the target storage region according to the logical block address carried with the read/write instruction.

In some embodiments, the optimization operations in the SSD may be predetermined based on the file system type. The file system may send the file system type to the SSD during the initialization. After receiving the file system type, the SSD storage system 200 may perform corresponding optimization operations to improve storage efficiency.

During the initialization, the SSD may interact with the file system, and obtain data writing feature information from the file system. The SLC region for storing metadata may be determined based on the data writing feature information. The SSD may perform optimization operations, such as the metadata backup, which improves the safety and reliability of data storage.

A non-transitory computer readable medium (e.g., the storage device 404) may be provided for storing data in SSD. The non-transitory computer readable medium may include at least one set of instructions for performing exemplary methods described in the present disclosure, for example, FIG. 5 or FIG. 10, and the descriptions thereof.

Various embodiments disclosed in the present disclosure may be applied to any kind of storage service or storage device. For example, the storage systems or methods may be applied to a vehicle-mounted system, a monitor system, an intelligent home system, an Internet of Things (IoT) system, or the like, or any combination thereof. As another example, the storage systems or methods may be applied to various digital device, such as a computer, a mobile device, a camera, a digital video recorder (DVR), a network video recorder (NVR), etc. As a further example, the storage systems or methods may be implemented on a cloud storage system.

Merely for illustration, a storage system of an autonomous driving system may configure with one or more SSDs. The SSDs may be configured to storage data or instructions from a user or the autonomous driving system, for example, user input data. During the data storage, the SSD may interact with a file system of the autonomous driving system. For example, before formatting the file system and the SSD, one or more initialization operations for the SSD and/or the file system may be performed. For the data to be stored, the file system may generate corresponding data structure including metadata and actual/normal data (as shown in FIG. 6). The file system may generate data writing feature information, and send it to the SSD. In most cases, the SSD may be the TLC Nand flash-based SSD. According to the data writing feature information, the SSD may determine a SLC region in the TLC region for specifically storing the metadata instead of normal data. In some embodiments, the metadata and the normal data may be stored separately. When the file system desires to read or write the metadata stored in the SSD, and the file system sends corresponding read or write instruction to the SSD. The SSD needs to identify the read or write instruction according to a preset rule. If the read or write instruction satisfies the preset rule, the SSD may perform the read or write operation for the metadata. The storage systems or methods disclosed in the present disclosure may improve the reliability of data storage in the SSD.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer-readable media having computer readable program code embodied thereon. The one or more computer-readable media may include ROM, RAM, magnetic disk, optical disk, or the like, or any combination thereof.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A storage method for a solid state disk (SSD), comprising:
    receiving, by a receiving module of a storage system for the SSD, data writing feature information sent by a file system of a host device via an interface during an initialization process, the data writing feature information including segmentation information regarding at least a data segment divided from metadata in the file system and a writing feature corresponding to each data segment, wherein the segmentation information includes a starting address, an end address, a write cycle, a write length, and a data type, the writing feature includes the write cycle and a block size, and the write cycle is a number of data blocks divided from normal data;
    determining, by a determination module of the storage system for the SSD, based on a size of storage space of the each data segment divided from the metadata, a size of metadata storage space corresponding to the metadata, wherein the size of storage space of the each data segment is determined based on the writing feature corresponding to the each data segment;
    determining, by a processing module of the storage system for the SSD, based on the size of the metadata storage space, a target storage region for storing the metadata in the SSD, a size of storage space of the target storage region being not less than the size of the metadata storage space, and a data storage capacity of a memory cell in the target storage region being less than a data storage capacity of a memory cell in other storage regions excluding the target storage region in the SSD;
    receive a read/write instruction sent by the file system;
    determine whether the read/write instruction satisfies a preset rule, wherein the preset rule includes that the read/write instruction is a preset private command for reading or writing metadata; and
    in response to the determination that the read/write instruction satisfies the preset rule, perform read/write operations for the metadata based on the read/write instruction.

2. The method of claim 1, wherein the determining, by a determination module of the storage system for the SSD, based on a size of storage space of the each data segment divided from the metadata, a size of the metadata storage space corresponding to the metadata further includes:
    determining the size of the metadata storage space corresponding to the metadata based on a sum of sizes of storage spaces of a plurality of data segments.

3. A storage system for a solid state disk (SSD), the system comprising:
    at least one non-transitory storage device including a set of instructions;
    at least one processor in communication with the at least one non-transitory storage device, wherein executing the set of instructions, the at least one processor is configured to cause the storage system to:
    receive, by a receiving module of the storage system for the SSD, data writing feature information sent by a file system of a host device via an interface during an initialization process, the data writing feature information including segmentation information regarding at least a data segment divided from metadata in the file system and a writing feature corresponding to each data segment, wherein the segmentation information includes a starting address, an end address, a write cycle, a write length, and a data type, the writing feature includes the write cycle and a block size, and the write cycle is a number of data blocks divided from normal data;
    determine, by a determination module of the storage system for the SSD, based on a size of storage space of the each data segment divided from the metadata, a size of metadata storage space corresponding to the metadata, wherein the size of storage space of the each data segment is determined based on the writing feature corresponding to the each data segment;
    determine, by a processing module of the storage system for the SSD, based on the size of the metadata storage space, a target storage region for storing the metadata in the SSD, a size of storage space of the target storage region being not less than the size of the metadata storage space, and a data storage capacity of a memory cell in the target storage region being less than a data storage capacity of a memory cell in other storage regions excluding the target storage region in the SSD;
    receive a read/write instruction sent by the file system;
    determine whether the read/write instruction satisfies a preset rule, wherein the preset rule includes that the read/write instruction is a preset private command for reading or writing metadata; and
    in response to the determination that the read/write instruction satisfies the preset rule, perform read/write operations for the metadata based on the read/write instruction.

4. The storage system of claim 3, wherein to determine, by a determination module of the storage system for the SSD, based on a size of storage space of the each data segment divided from the metadata, a size of the metadata storage space corresponding to the metadata, the at least one processor is further configured to cause the storage system to:
    determine the size of the metadata storage space corresponding to the metadata based on a sum of sizes of storage spaces of a plurality of data segments.

5. The storage system of claim 3, wherein to determine, by a processing module of the storage system for the SSD, based on the size of the metadata storage space, a target storage region for storing the metadata in the SSD, the at least one processor is further configured to cause the storage system to:
    determine, based on the size of the metadata storage space, storage space that is greater than or equal to the metadata storage space as the target storage region; and
    set a storage mode of the target storage region as a single level cell (SLC) memory mode.

6. The storage system of claim 5, wherein after determining, based on a size of storage space of the each data segment divided from the metadata, a size of the metadata storage space corresponding to the metadata, the at least one processor is further configured to cause the storage system to:
 determine, based on the size of the metadata storage space, storage space for storing backup data regarding the metadata.

7. The storage system of claim 3, wherein the preset rule further includes a logical block address carried with the read/write instruction and a Feature field, the logical block address corresponds to the metadata, and the preset private command is defined to read or write the metadata by setting a field value of the Feature field.

8. The storage system of claim 7, wherein prior to the receiving data writing feature information sent by a file system, the at least one processor is further configured to cause the storage system to:
 receive an acquisition instruction from the file system, wherein the acquisition instruction for acquiring SSD information regarding the SSD, and the SSD information includes at least one of a device model and physical page information regarding the SSD; and
 send the SSD information to the file system, wherein the file system determines whether the SSD is a preset SSD based on the device model, and/or sets a physical page size in a write operation corresponding to the metadata based on the physical page size indicated by the physical page information.

9. A storage system for a file system, the system comprising:
 at least one non-transitory storage device including a set of instructions;
 at least one processor in communication with the at least one non-transitory storage device, wherein executing the set of instructions, the at least one processor is configured to cause the storage system to:
 during an initialization process, generate, by a generation module of the storage system for the file system of a host device, data writing feature information including segmentation information regarding at least a data segment divided from metadata in the file system and a writing feature corresponding to each data segment, wherein the segmentation information includes a starting address, an end address, a write cycle, a write length, and a data type, the writing feature includes the write cycle and a block size, and the write cycle is a number of data blocks divided from normal data;
 send, by a sending module of the storage system for the file system, the data writing feature information to the SSD via an interface the host device, wherein the SSD determines a target storage region for storing the metadata in the SSD based on the data writing feature information, a size of storage space of the target storage region being not less than a size of metadata storage space, and a data storage capacity of a memory cell in the target storage region being less than a data storage capacity of a memory cell in other storage regions excluding the target storage region in the SSD;
 receive a read/write instruction sent by the file system;
 determine whether the read/write instruction satisfies a preset rule, wherein the preset rule includes that the read/write instruction is a preset private command for reading or writing metadata; and
 in response to the determination that the read/write instruction satisfies the preset rule, perform read/write operations for the metadata based on the read/write instruction.

10. The storage system of claim 9, wherein prior to generating data writing feature information, the at least one processor is further configured to cause the storage system to:
 read SSD information regarding the SSD, the SSD information including at least one of a device model and physical page information regarding the SSD; and
 determine whether the SSD is a preset SSD based on the device model or setting a physical page size in a write operation corresponding to the metadata based on the physical page size indicated by the physical page information.

11. The storage system of claim 9, wherein the at least one processor is further configured to cause the storage system to:
 send the read/write instruction to the SSD, wherein the SSD performs, based on the read/write instruction, the read/write operations for the metadata, wherein the read/write instruction further includes a logical block address carried with the read/write instruction, the logical block address corresponding to the metadata.

12. The storage system of claim 3, wherein the file system is configured to:
 during the initialization process, generate the data writing feature information; and
 send the data writing feature information to the SSD, wherein the SSD determines the target storage region for storing the metadata in the SSD based on the data writing feature information.

13. The storage system of claim 12, wherein prior to generating data writing feature information, the file system is configured to:
 read SSD information regarding the SSD, the SSD information including at least one of a device model and physical page information regarding the SSD; and
 determine whether the SSD is a preset SSD based on the device model or set a physical page size in a write operation corresponding to the metadata based on the physical page size indicated by the physical page information.

14. The storage system of claim 12, wherein after sending the data writing feature information to the SSD, the file system is configured to:
 send the read/write instruction to the SSD, wherein the SSD performs, based on the read/write instruction, the read/write operations for the metadata, wherein the read/write instruction further includes a logical block address carried with the read/write instruction, the logical block address corresponding to the metadata.

15. The storage system of claim 9, wherein the SSD is configured to:
 receive the data writing feature information sent by the file system during the initialization process;
 determine, based on a size of storage space of the each data segment divided from the metadata, a size of the metadata storage space corresponding to the metadata, wherein the size of storage space of the each data segment is determined based on the writing feature corresponding to the each data segment; and
 determine, based on the size of the metadata storage space, the target storage region for storing the metadata in the SSD.

16. The storage system of claim 15, wherein to determine, based on a size of storage space of the each data segment divided from the metadata, the size of the metadata storage space corresponding to the metadata, the SSD is configured to:

determine the size of the metadata storage space corresponding to the metadata based on a sum of sizes of storage spaces of a plurality of data segments.

17. The storage system of claim 15, wherein to determine, based on the size of the metadata storage space, the target storage region for storing the metadata in the SSD, the SSD is configured to:

determine, based on the size of the metadata storage space, storage space that is greater than or equal to the metadata storage space as the target storage region; and set a storage mode of the target storage region as a single level cell (SLC) memory mode.

18. The storage system of claim 17, wherein after determining, based on a size of storage space of the each data segment divided from the metadata, the size of the metadata storage space corresponding to the metadata, the SSD is configured to:

determine, based on the size of the metadata storage space, storage space for storing backup data regarding the metadata.

19. The storage system of claim 18, wherein the preset rule further includes a logical block address carried with the read/write instruction and a Feature field, the logical block address corresponds to the metadata, and the preset private command is defined to read or write the metadata by setting a field value of the Feature field.

20. The storage system of claim 19, wherein prior to the receiving the data writing feature information sent by the file system, the SSD is configured to:

receive an acquisition instruction from the file system, wherein the acquisition instruction for acquiring SSD information regarding the SSD, and the SSD information includes at least one of a device model and a physical page information regarding the SSD; and send the SSD information to the file system, wherein the file system determines whether the SSD is a preset SSD based on the device model, and/or sets a physical page size in a write operation corresponding to the metadata based on the physical page size indicated by the physical page information.

\* \* \* \* \*